United States Patent [19]
Deardurff et al.

[11] Patent Number: 5,683,731
[45] Date of Patent: Nov. 4, 1997

[54] MELT FLOW REDISTRIBUTOR

[75] Inventors: L. Robert Deardurff, Waterville; Long Fei Chang, Sylvania, both of Ohio

[73] Assignee: Husky Injection Molding Systems Ltd., Canada

[21] Appl. No.: 570,333

[22] Filed: Dec. 11, 1995

[51] Int. Cl.[6] .................................................. B29C 45/27
[52] U.S. Cl. ...................... 425/572; 425/588; 264/328.8; 264/328.12
[58] Field of Search ........................... 425/572, 588; 264/328.8, 328.12

[56] References Cited

U.S. PATENT DOCUMENTS

| | | | |
|---|---|---|---|
| 3,940,224 | 2/1976 | Armour | 425/572 |
| 3,977,820 | 8/1976 | Beyerlein et al. | 425/572 |
| 4,299,553 | 11/1981 | Swaroop | 425/572 |
| 4,541,982 | 9/1985 | Upmeier | |
| 4,682,944 | 7/1987 | Muller | 425/572 |
| 4,848,920 | 7/1989 | Heathe | |
| 4,900,560 | 2/1990 | Trakas | 425/572 |
| 4,909,725 | 3/1990 | Ward | 425/572 |
| 5,217,730 | 6/1993 | Teng | 425/572 |
| 5,269,184 | 12/1993 | Gellert | 425/572 |

*Primary Examiner*—Khanh P. Nguyen
*Attorney, Agent, or Firm*—Bachman & LaPointe, P.C.

[57] ABSTRACT

A redistributing device for use with melt flow exhibiting boundary layer flow and centralized flow comprises a body including a melt flow inlet end and a plurality of melt flow outlets. A first flow diverter is included for distributing at least the boundary layer flow among the plurality of the melt flow outlets. A second flow diverter is included for distributing at least the centralized flow among the plurality of melt flow outlets.

12 Claims, 3 Drawing Sheets

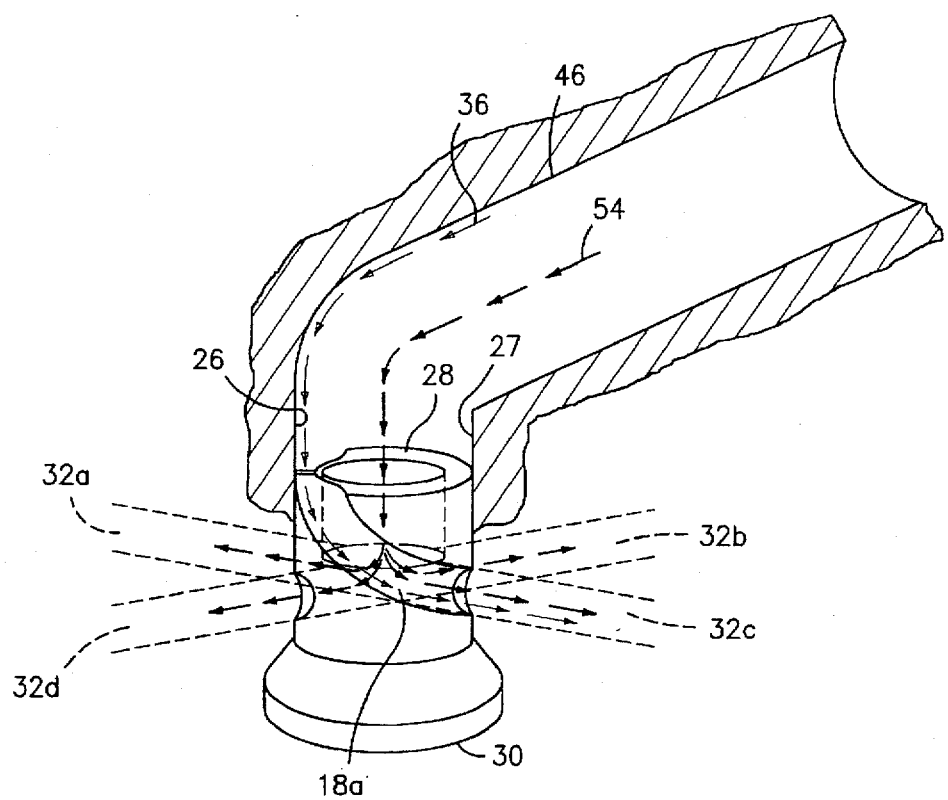
FIG-3B
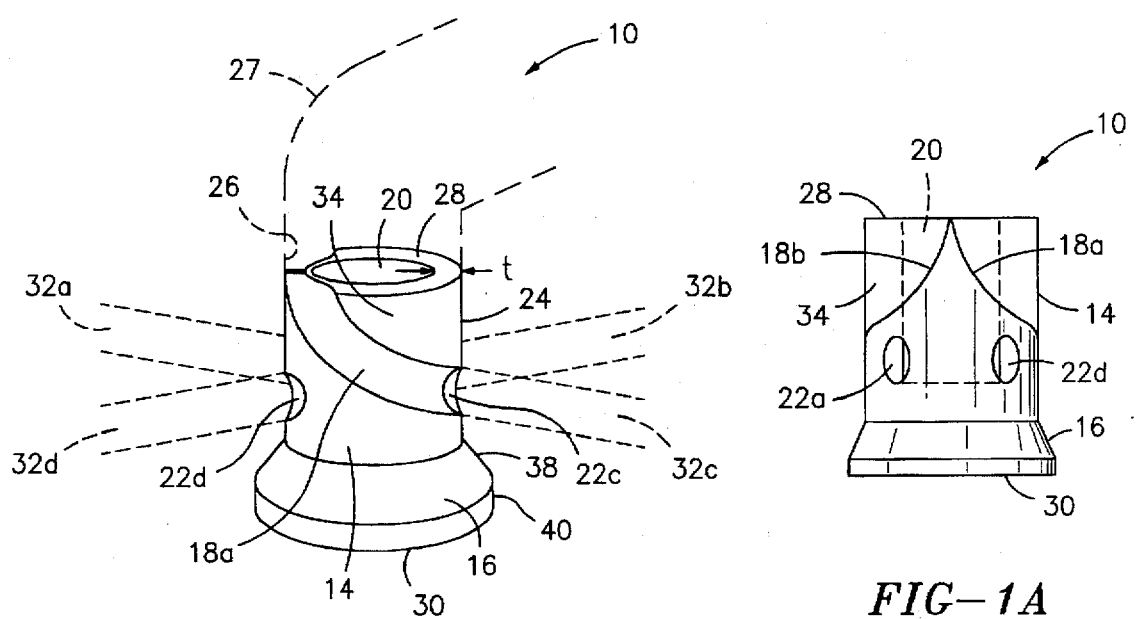
FIG-1
FIG-1A

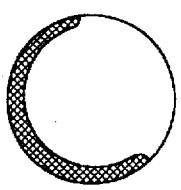
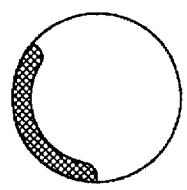
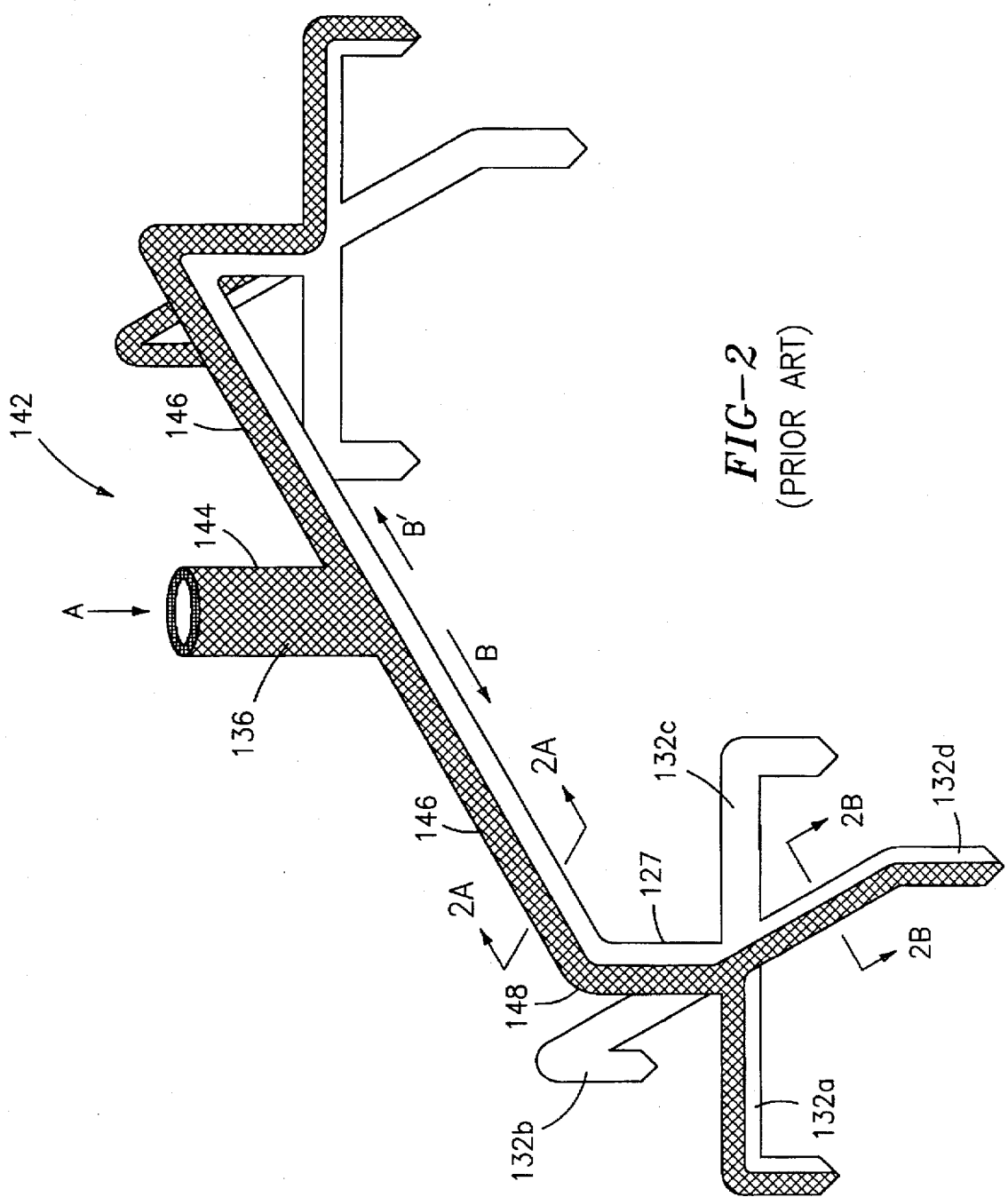

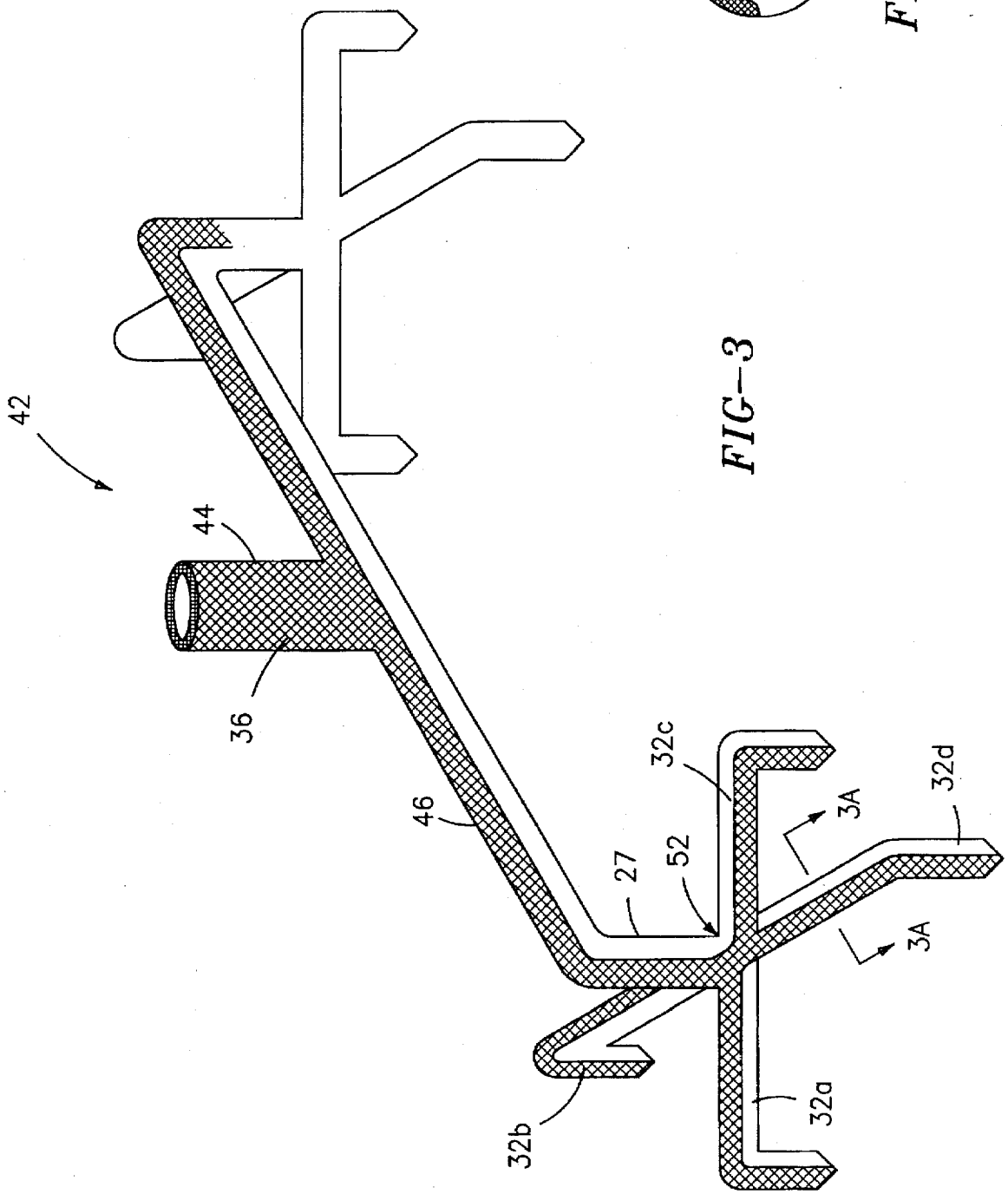

MELT FLOW REDISTRIBUTOR

BACKGROUND OF THE INVENTION

The present invention is directed toward management of melt or resin flow in injection molding machines, and more particularly, to a device for redistributing degraded boundary layer melt or resin in an injection molding hot runner such that the composition of the melt in the channels of the hot runner are all inclusive of substantially equivalent amounts of degraded boundary layer melt.

In the injection molding industry, plastic resin will exhibit chemical breakdown and degradation as a result of being exposed to high heat over a short period of time or a relatively lower heat over a longer period of time. This degradation is objectionable and can be identified in the plastic molded article by its deleterious effect on mechanical, chemical and visual properties of the plastic. Inevitably, some amount of plastic degradation will be detectable in any injection molded article. Accordingly, many attempts have been made to reduce degradation to a tolerable or acceptable level through better general management of the plastic melt stream from the point at which it becomes melted in the injection molding machine extruder to the time when it arrives at the cavity gate orifice.

In the art, it has been discovered that plastic boundary layers are formed on the outermost periphery of the heated metal channels due to the fact that plastic will adhere to the walls of the hot runner conduit system. In addition, the plastic flows at a reduced velocity closer to the walls of the melt channel, further emphasizing boundary layers. These occurrences result in a portion of the plastic having an increased residence time, as compared to faster flowing material at the center of the melt channel. As the material close to the wall eventually moves along and finally into the mold cavity, degradation can be evidenced by the concentration or streak of degraded plastic mixed in with plastic of relatively better quality.

Further, when molding multiple cavities from a single plastic melt stream, there is commonly a preferential flow of material to one or more cavities. This creates an imbalance in the amount of degraded material found in one molded article when compared to another. In some cases involving multiple cavities, certain cavities will produce articles having far less degraded material than was considered acceptable while other cavities will produce articles having an amount of degraded material exceeding the acceptable limit.

For injection molding machines having multi-cavity molds, a melt distribution system which is comprised of numerous intersecting channels drilled into a hot runner manifold is typically required. Generally, the manifold is heated to keep the melted plastic at a constant desirable temperature between molding cycles. During each injection phase, the resin is pushed further along the channels towards the cavity gate orifice. It has been found that while the boundary layer is developed in the channel, as previously explained, it is not annularly symmetrical. That is, it may be considerably thicker on one side as compared to the diametrically opposed side. It is also found that when one feeder channel diverges 90° into at least two cross-channels, the boundary layer from one-half of the feeder channel goes to one cross-channel while the other half of boundary layer goes to the other cross-channel. Further, the half of the boundary layer which flows into a cross-channel prefers to stay on the inside turn surface of the cross-channel, while fresh plastic melt from the center of the feeder channel tends to relocate to the wall of the cross-channel diametrically opposing the inside turn. These movements result in a boundary layer which is crescent shaped rather than having an even tubular shape.

Since the boundary layer is now crescent shaped, if the cross-channel itself branches off into two or more sub-channels, the sub-channels may not receive equal portions of the degraded boundary layer. The sub-channel which intersects the cross-channel at the position where the thickest portion of the boundary layer exists, receives the greatest amount of the boundary layer due to the inside turn principle. In multi-cavity molding, this results in certain predictable molded articles having a higher content of degraded resin having its origin at the boundary layer, as compared to other articles formed during the same injection phase. A detailed description of a hot runner channel system exhibiting the above discussed characteristics is provided in the Detailed Description section, below.

The prior art does include several devices directed toward improving non-homogeneous melt streams and molded articles resulting therefrom.

U.S. Pat. No. 4,848,920 to Heathe et al. discloses a static mixer. The static mixer serves to striate and recombine the melt stream numerous times. The claimed resultant effect is one in which a thorough mixing of the melt is achieved. However, it has been determined that some very thermally sensitive resins will experience shear heating while passing through the mixer, actually generating additional degraded material albeit equally dispersed across the channel. In some applications, this increase in degraded material may raise the total amount of degraded material within each article to an unacceptable level. It has also been found that in some cases it is detrimental to achieve a mixed material and that it is preferred to keep the low degradation content material relatively undisturbed and directed to one desired cross channel location.

U.S. Pat. No. 4,541,982 to Upmeier discloses a process and apparatus for forming and rearranging partial streams of molten materials processed in an extruder for making thermoplastic and/or elastomeric products. The patent shows a distributing disc which is inserted into a melt channel and serves to divide a flow into partial streams. The partial streams are diverted either radially inward or radially outward and then recombined. The concept of this device is to bring the outer more degraded boundary layers to the channel center and move the inner fresher material through to the wall of the channel. Ideally, this method should result in a channel having proportionally similar amounts of degraded resin across its entire cross-section. This is not always desirable and control of the gradient in cross-section is preferred. However, the specific design of the disc is such that it creates an undesirable pressure drop as well as adds a shear heating effect to the resin as it passes therethrough.

The prior art discussed above, including mixers, require that a large number of devices be placed in all positions before cross-channels or sub-channels. In a mold having a high number of cavities, this may require dozens of mixers or the like which would increase the overall amount of shear induced degraded resin and provide undesirable pressure drop. Additionally, the prior art does not address the situation of having a non-uniform boundary layer and may never fully homogenize the melt stream.

There exists, therefore, a need for a device for insertion into a melt channel stream which functions to redistribute the boundary layer of the melt channel substantially equally among all channels branching therefrom so as to acquire a substantially equal and desirable distribution of boundary layer and centralized melt in the various molds of a multi-cavity injection molding machine.

SUMMARY OF THE INVENTION

The primary object of this invention is to provide a device for redistributing boundary layer and centralized melt flow in hot runner channels so as to achieve molded articles having substantially homogeneous melt compositions.

Another object of this invention is to provide a device for substantially equally distributing degraded melt flow from boundary layers among a plurality of channels used in a multi-cavity injection molding machine.

Still another object of this invention is to provide a melt flow redistributor which does not undesirably create pressure drops and/or increase the amount of degraded material in molded articles to an unacceptable level.

And still another object of this invention is to provide a melt flow redistributor which is simple in design and easy to use.

The foregoing objects and advantages are achieved by the redistributing device of the present invention for use with melt flow exhibiting boundary layer flow and centralized flow which comprises a body including a melt flow inlet end and a plurality of melt flow outlets. A first diverter is included for distributing at least the boundary layer among the plurality of the melt flow outlets. A second diverter is included for distributing at least the relatively undisturbed centralized flow among the plurality of melt flow outlets for mixture with the boundary layer flow.

In one embodiment of the redistributor, the body includes a body portion and a base portion, wherein the base portion has a diameter greater than that of the body portion. The body further includes a tapered portion extending between the base portion and the body portion, wherein the taper is adapted to engage a mating taper in a hot runner channel.

The details of the present invention are set out in the following description and drawings wherein like reference characters depict like elements.

BRIEF DESCRIPTION OF THE DRAWINGS

FIG. 1 is an elevational view of the redistributing device of the present invention;

FIG. 1A is an elevational view of the redistributing device of FIG. 1 turned through approximately 90°;

FIG. 2 is a perspective view of a hot runner melt flow channels including the redistributor of the present invention;

FIG. 2A is a cross-sectional view taken along line 2A—2A of FIG. 2;

FIG. 2B is a cross-sectional view taken along line 2B—2B of FIG. 2;

FIG. 3 is a perspective view of a hot runner and melt flow channels without the use of the redistributor of the present invention;

FIG. 3A is a cross-sectional view taken along line 3A—3A of FIG. 3; and

FIG. 3B is an enlarged elevational and partly cross-sectional view of the encircled area of FIG. 3 including the redistributor of the present invention positioned in the melt flow channel.

DETAILED DESCRIPTION OF THE PREFERRED EMBODIMENT

Referring now to the drawings in detail, there is shown in FIG. 1 an elevational and partially cross-sectional view of the melt flow redistributor of the present invention, designated generally as 10. Generally, redistributor 10 includes a tubularly shaped main body portion or housing 14, an enlarged lower portion 16, at least two diverters preferably in the form of ramps 18a and 18b (18b shown in FIG. 1A), a central opening 20 and a plurality of radially positioned openings 22a–22d (22b not shown). Body portion 14 is preferably tubular in shape having an outer diameter 24 adapted to closely fit within inner diameter 26 of channel 27 (shown by broken lines in FIG. 1), as shown in FIG. 3B.

Top inlet end 28 of main body portion 14 is open, including central inlet opening 20 in fluid communication with channel 27 and cross-channel 46 and bottom end 30 is preferably closed. Central opening 20 extends into main body portion 14, a substantial portion of the length thereof. At the bottom of opening 20, radially positioned outlet openings 22a–22d extend into central opening 20, substantially transversely thereto, such that fluid flow is capable between central opening 20 and radially positioned outlet openings 22a–22d. Radially positioned outlet openings 22a–22d are preferably positioned on main body portion 14 at a radial spacing of approximately 90° or whatever spacing is required depending upon the specific design of the channels 32a–32d (shown by broken lines in FIG. 1) to which radially positioned openings 22a–22d are adapted to be connected, respectively.

Since the body portion 14 is preferably tubular in shape, wall 34 has a thickness t, which thickness t is sufficient for the forming thereon of diverting and distributing ramps 18a and 18b, as shown in FIGS. 1 and 1A. Each of ramps 18a and 18b begin near top inlet end 28 of main body portion 14 and extend downwardly on an angle and in a semi-circular manner, cutting along wall 34 of main body portion 14 to distribute and direct at least a substantial portion of boundary layer melt flow 36, represented by the arrows, to channels 32b and 32c, which channels 32b and 32c normally receive only a minimal amount of boundary layer melt 36 due to the designs of the hot runners which include the melt channels and the melt flow characteristics.

Accordingly, ramps 18a and 18b are positioned at the outer edge of main body portion 14 and in the path of boundary layer melt 36 so that boundary layer melt 36 is partially diverted from channels 32a and 32d and partially redistributed to channels 32b and 32c.

Enlarged lower portion 16 allows redistributor 10 to also serve as a hot runner channel plug. Since channels of a hot runner are typically formed in a metal block or the like, ends of channels which do not lead to additional channels, such as at an intersection of crossing channels, should be plugged. Accordingly, as discussed above, the diameter of main body portion 14 is preferably closely fit to the inner diameter of channel 27. In addition, a tapered portion 38 is preferably provided and extends from the end of main body portion 14 to the outer diameter 40 of enlarged lower portion 16. Tapered portion 38 is preferably designed to fit adjacent a mating tapered surface formed into the metal block in which the channels of the hot runner have been formed. The mating tapered portion and surface prevent plastic from squeezing out of the metal block and into the surrounding environment. Alternatively, a headed (non-tapered) design may be with or without the addition of a sealing device such as an 0-ring. A variety of rather similar design solutions may be thus considered to address this issue.

In describing the operation of redistributor 10, reference is made first to the prior art hot runner channel system 142 of FIG. 2, wherein melt flow of the system is shown, i.e. with redistributor 10 of the present invention not used. The path of the cross-hatching in FIG. 2 is representative of the primary flow paths of boundary layer melt 136. Melt or resin flows into channel system 142 as shown by arrow A. Boundary layer melt 136 forms a ring pattern in entrance channel 144. Entrance channel 144 extends into cross-channels 146 wherein the flow of boundary layer melt 136 is split in opposite directions as represented by arrows B and B'. In cross-channels 146, boundary layer melt 136 takes on the crescent formation shown in FIG. 2A.

Boundary layer melt 136 continues flow through elbow 148, substantially maintaining the crescent shape and into channel 127 and intersecting channels 132a–132d. As boundary layer melt 136 enters intersecting channels 132a–132d, the boundary layer melt is divided again, and due to the flow characteristics and the construction of hot runner channel system 142, is primarily directed into intersecting channels 132a and 132d, taking on a substantially half-crescent cross-section in these channels as shown in FIG. 2B.

As shown in FIG. 2, very little boundary layer melt 136 flows into channels 132b and 132c, indicating that the distribution of the melt types flowing through channel system 142 is not adequate. That is, channels 132b and 132c receive primarily centralized melt flow and not boundary layer melt 136 and channels 132a and 132d receive an unacceptable amount of boundary layer melt. Accordingly, molded articles formed by melt flowing through these channels acquire different compositions, some of which include significantly greater amounts of boundary layer or degraded melt than is acceptable.

Referring now to FIG. 3, the flow of boundary layer melt 36 from entrance channel 44 is shown via cross-hatching for hot runner channel system 42 having redistributor 10 installed in channel 27 at the intersection 52 of intersecting channels 32a–32d and channel 27, as shown in detail in FIG. 3. As shown by the cross-hatching, the flow of the boundary layer melt 36 is more evenly distributed among the intersecting channels than that of the prior art channel 142 not having redistributor 10.

Referring now to FIG. 1A and more particularly to FIG. 3B, an enlarged view of intersection 52 is shown with redistributor 10 installed in channel 27 and the operation of redistributor 10 is discussed. Intersection 52 is shown in FIG. 3B turned through an angle of approximately 90° from the position it would take in the perspective view of the system of FIG. 3, so that ramp 18a is frontwardly exposed for viewing. Accordingly, as boundary layer melt 36 flows toward redistributor 10, at least a portion of boundary layer melt intersects with ramps 18a and 18b.

Centralized melt 54 flows through central opening 20 and in a substantially equal portions into radially positioned openings 22a–22d. However, a portion of boundary layer melt 36 enters central opening 20 and is distributed into intersecting channels 32a and 32d while another portion of boundary layer melt 36 is split via ramps 18a and 18b and directed into intersecting channels 32a and 32c, as shown by the arrows. In accordance with this distribution system, both boundary layer melt and centralized melt are directed to the plurality of intersecting channels in substantially equal amounts. A portion of boundary layer melt 36 travels along ramp 18a and into intersecting channel 32c and a portion of boundary layer melt 36 is directed along ramp 18b into intersecting channel 32b. Without redistributor 10, a substantial portion of boundary layer melt directed along ramps 18a and 18b would have flowed into intersecting channels 32a and 32d, leaving intersecting channels 32b and 32c substantially void of boundary layer melt, as shown for the prior art.

While only one type of hot runner channel system is shown, redistributor 10 of the present invention can be used with a variety of different types of hot runner channel systems such as, for example, 2, 4, 6, 8, 12, 16 and 24 drop configurations.

Based on information known about the boundary layer flow for particular systems, redistributor 10 can be custom designed for the particular system. Information such as flow path turns, channel directions, channel lengths and diameters, temperature of the hot runners, temperature of the incoming melt, injection pressure and velocity, resin characteristics, melt residence time in the hot runner, etc., can be used to design the optimum redistributor 10 for use with particular systems. Accordingly, the boundary layer melt can be successfully rerouted while minimizing disturbances to the melt, achieving a free flowing system with minimal pressure drop and more even distribution of degraded boundary layer melt within intersecting channels.

In each instance of use, redistributor 10 is positioned at an intersection area for appropriately redistributing boundary layer melt to the intersecting channels which typically do not receive boundary layer melt due to the factors discussed above which are determined for the particular channel system. Accordingly, different designs of the redistributor can be realized having a plurality of diverter or ramp systems for re-directing boundary layer melt to the desired locations. Another major advantage of this invention is represented by its applicability in conjunction with the hot runner conduits of a stack mold, as an effective means to balance flow of the melt between mold stations.

The primary advantage of this invention is that a device is provided for redistributing boundary layer and centralized melt flow in hot runner channels so as to achieve molded articles having substantially homogeneous melt type compositions. Another advantage of this invention is that a device is provided for substantially equally distributing degraded melt flow from boundary layers among a plurality of channels used in a multi-cavity injection molding machine. Still another advantage of this invention is that a melt flow redistributor is provided which does not undesirably create pressure drops and/or increase the amount of degraded material in molded articles to an unacceptable level. And still another advantage of this invention is that a melt flow redistributor is provided which is simple in design and easy to use.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A redistributing device for use with melt flow exhibiting boundary layer and centralized flow, comprising:
   a body including a melt flow inlet end and a plurality of melt-flow outlets, said body engaging a melt flow channel;
   first means in said body for distributing at least said boundary layer among said plurality of melt flow outlets;
   second means in said body for distributing at least said centralized flow among said plurality of melt flow outlets;

wherein said body has a central opening therein defining a central flow channel in fluid communication with said outlets comprising said second means for distributing, and said first means for distributing comprises inlets leading to a plurality of diverters positioned on said body and adjacent said opening, said diverters extending from said inlet end and into fluid communication with said plurality of melt-flow outlets, wherein the material flowing in the central channel meets the material flowing in the diverters and emerges at the outlets.

2. The device according to claim 1, wherein said diverters distribute a portion of said boundary layer flow to said plurality of melt flow outlets.

3. The device according to claim 2, wherein each of said diverters is a ramp beginning at said inlet end and extending into at least one of said plurality of melt-flow outlets.

4. The device according to claim 1, wherein said second means for distributing comprises a means positioned in said body for receiving said centralized flow, wherein said centralized flow comprises melt-flow not received by said means for distributing, said means for receiving fluid flow connected with said plurality of melt-flow outlets.

5. The device according to claim 4, wherein said means for receiving comprises an opening in said body beginning at said melt-flow inlet end and extending to said plurality of outlets for directing said centralized flow to said outlets.

6. The device according to claim 1, wherein each of said plurality of outlets extends from said opening and through said body.

7. The device according to claim 6, wherein said outlets extend substantially transverse to said opening.

8. The device according to claim 1, wherein said body has a tubular shape defined by a wall having a thickness, said ramps formed in said thickness of said wall and extending angularly downward along said wall from said inlet end and into said fluid communication with said melt-flow outlets.

9. The device according to claim 1, further including means for using said device as a hot runner channel plug.

10. The device according to claim 9, wherein said means for using comprise said body having a shape for facilitating sealing engagement with a hot runner channel.

11. The device according to claim 10, wherein said shape is substantially tubular.

12. The device according to claim 10, wherein said body includes a body portion and a base portion, and wherein said base portion has a diameter greater than that of said body portion, further including a tapered portion extending between said base portion and said body portion, wherein said tapered portion is adapted to engage a mating tapered surface in said hot runner channel.

* * * * *